(12) United States Patent
Ito

(10) Patent No.: US 8,455,151 B2
(45) Date of Patent: Jun. 4, 2013

(54) FUEL CELL WITH ELECTROLYTE STRENGTHENING SUBSTRATE HAVING A PENETRATION PORTION

(75) Inventor: Naoki Ito, Yokohama (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 775 days.

(21) Appl. No.: 11/920,832

(22) PCT Filed: Jun. 9, 2006

(86) PCT No.: PCT/JP2006/312082
§ 371 (c)(1),
(2), (4) Date: Nov. 21, 2007

(87) PCT Pub. No.: WO2006/135033
PCT Pub. Date: Dec. 21, 2006

(65) Prior Publication Data
US 2009/0142643 A1 Jun. 4, 2009

(30) Foreign Application Priority Data
Jun. 17, 2005 (JP) .................................. 2005-178634

(51) Int. Cl.
*H01M 8/10* (2006.01)
(52) U.S. Cl.
USPC ............................ 429/481; 429/517; 429/514
(58) Field of Classification Search
USPC .................................. 429/34, 517, 481, 514
See application file for complete search history.

(56) References Cited

U.S. PATENT DOCUMENTS

2004/0043277 A1   3/2004   Ito et al.
2005/0048343 A1*  3/2005   Thirukkvalur ............... 429/32

FOREIGN PATENT DOCUMENTS

| JP | 03-110761   | * 5/1991 |
| JP | A-03-110761 |   5/1991 |
| JP | A-04-345762 |  12/1992 |
| JP | A-07-335234 |  12/1995 |
| JP | 200-315507  | * 11/2000 |
| JP | A-2000-315507 | 11/2000 |
| JP | A-2004-146337 |  5/2004 |
| JP | A-2005-243427 |  9/2005 |
| WO | WO 2004/084333 A1 | 9/2004 |

* cited by examiner

*Primary Examiner* — Zachary Best
(74) *Attorney, Agent, or Firm* — Oliff & Berridge, PLC

(57) ABSTRACT

A fuel cell 100 is characterized by including an electrolyte 30, and an electrolyte-strengthening member 10 that has a penetration portion 11 and strengthens the electrolyte. The electrolyte 30 has a high-electrical-current-density region of which electrical current density is higher than an average electrical current density of the electrolyte 30 and has a low-electrical-current-density region of which electrical current density is lower than the average electrical current density, at a face thereof on an opposite side of the electrolyte-strengthening substrate 100. An area where the penetration portion 11 faces with the high-electrical-current-density region is larger than that where the penetration portion 11 faces with the low-electrical-current-density region.

7 Claims, 10 Drawing Sheets

FUEL CELL WITH ELECTROLYTE STRENGTHENING SUBSTRATE HAVING A PENETRATION PORTION

TECHNICAL FIELD

This invention generally relates to a fuel cell that has an electrolyte.

BACKGROUND ART

In general, a fuel cell is a device that obtains electrical power from fuel, hydrogen and oxygen. Fuel cells are being widely developed as an energy supply device because fuel cells are environmentally superior and can achieve high energy efficiency.

The fuel cell has a structure in which a plurality of electrical power generators is stacked with a separator being interposed therebetween, the electrical power generator having a structure in which an anode and a cathode hold an electrolyte therebetween. A recess is formed on the separator and is used as a passageway of reactant gas provided from outside. With the structure, the reactant gas provided to the separator from outside is provided to the anode and the cathode, and the fuel cell generates electrical power.

Patent Document 1 discloses a fuel cell having a separator and a strengthening-substrate that strengthens the electrolyte. With the fuel cell, a contact resistance is reduced because members are electrically conducted. An electric generation efficiency of the fuel cell is therefore increased.

Patent Document 1: Japanese Patent Application Publication No. 3-110761

DISCLOSURE OF THE INVENTION

Problems to be Solved by the Invention

However, with the art disclosed in Patent Document 1, concavity and convexity are arranged on the separator in random order, and holes are formed in the strengthening-substrate in random order. Therefore, there is a case where an effective power generating area is reduced in the electrical power generator.

An object of the present invention is to provide a fuel cell that has a large effective power generating area in an electrical power generator.

Means for Solving the Problems

A fuel cell in accordance with the present invention is characterized by comprising an electrolyte and an electrolyte-strengthening member that has a penetration portion and strengthens the electrolyte. The electrolyte has a high-electrical-current-density region of which electrical current density is higher than an average electrical current density of the electrolyte and has a low-electrical-current-density region of which electrical current density is lower than the average electrical current density, at a face thereof on an opposite side of the electrolyte-strengthening substrate. An area where the penetration portion faces with the high-electrical-current-density region is larger than that where the penetration portion faces with the low-electrical-current-density region.

With the fuel cell in accordance with the present invention, fuel gas is provided to the electrolyte via the penetration portion. The electrical current density at the penetration portion is increased at the face of the electrolyte at the electrolyte-strengthening member side. In this case, effective power generating area is increased, because the area where the penetration portion faces with the high-electrical-current-density region is larger than that where the penetration portion faces with the low-electrical-current-density region. The electric generation efficiency of the fuel cell in accordance with the present invention is therefore increased.

The penetration portion may be arranged so as to face with the high-electrical-current-density region. In this case, high-electrical-current-density region at a face of the electrolyte at the electrolyte-strengthening substrate side corresponds to high-electrical-current-density region at a face of the electrolyte at an opposite side of the electrolyte-strengthening substrate. It is possible to increase the electric generation efficiency of the fuel cell in accordance with the present invention at a maximum.

The fuel cell may include an electrode that is provided on the electrolyte on an opposite side of the electrolyte-strengthening substrate, and a separator that is provided on the electrode on an opposite side of the electrolyte. A concave portion and a convex portion may be formed on the separator at the electrolyte side. The high-electrical-current-density region may be a region facing with a region where the convex portion of the separator contacts with the electrode. In this case, it is possible to increase the effective power generating area, even if the electrical current varies because of the concave portion and the convex portion of the separator.

Effects of the Invention

According to the present invention, the effective power generating area is increased. The electric generation efficiency is therefore increased.

BEST MODES FOR CARRYING OUT THE INVENTION

A description will be given of best modes for carrying out the present invention.

First Embodiment

Figure 1:
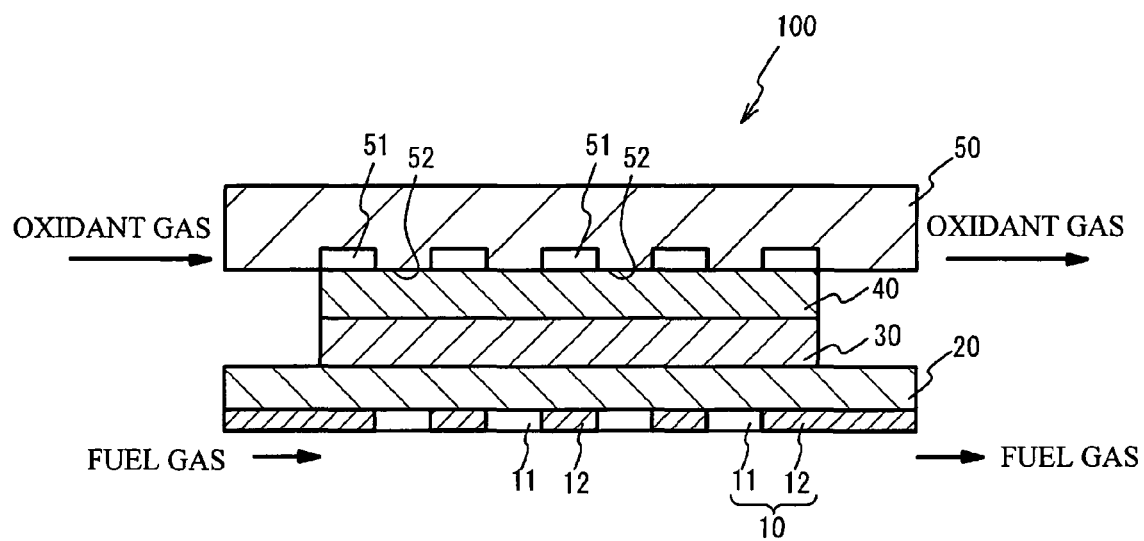
FIG. 1 illustrates a schematic cross sectional view of a fuel cell in accordance with a first embodiment of the present invention.

FIG. 1 illustrates a schematic cross sectional view of a fuel cell 100 in accordance with a first embodiment of the present invention. In this embodiment, a hydrogen permeable membrane fuel cell is used as a fuel cell. Here, the hydrogen permeable membrane fuel cell has a hydrogen permeable membrane. The hydrogen permeable membrane is composed of a metal having hydrogen permeability. The hydrogen permeable membrane fuel cell has a structure in which an electrolyte having proton conductivity is deposited on the hydrogen permeable membrane. Some hydrogen provided to an anode is converted into protons with catalyst reaction. The protons are conducted in the electrolyte having proton conductivity, react with oxygen provided to a cathode, and converted into water.

As shown in FIG. 1, the fuel cell 100 has a structure in which a hydrogen permeable membrane 20, an electrolyte 30, a cathode 40 and a separator 50 are laminated in order on a strengthening-substrate 10. The strengthening substrate 10 is made of a metal substrate in which a plurality of through holes 11 is formed. The strengthening substrate 10 is composed of a conductive material such as a stainless steel. An area where the strengthening substrate 10 contacts with the hydrogen permeable membrane 20 is referred to as a strengthening portion 12.

The hydrogen permeable membrane 20 acts as an anode to which fuel gas is provided, and is composed of a hydrogen permeable metal. A metal composing the hydrogen permeable membrane 4 is such as palladium, vanadium, titanium, tantalum or the like. The electrolyte 30 is, for example, composed of a proton conductor such as a perovskite-type proton conductor ($BaCeO_3$ or the like), a solid acid proton conductor ($CsHSO_4$ or the like).

The cathode 40 is an electrode to which oxidant gas is provided. The cathode 40 is, for example, composed of a conductive material such as lanthanum cobaltite, lanthanum manganate, silver, platinum, or platinum-supported carbon. The separator 50 is composed of a conductive material such as a stainless steal. A plurality of grooves is formed on the cathode 40 side of the separator 50. The groove is referred to as a gas passageway 51. And, an area where the separator 50 contacts with the cathode 40 is referred to as a contact portion 52. In the embodiment, the strengthening substrate 10 and the separator 50 are formed so that the through hole 11 faces with the contact portion 52 and the strengthening portion 12 faces with the gas passageway 51.

Next, a description will be given of an operation of the fuel cell 100. A fuel gas including hydrogen is provided to the strengthening substrate 10. This fuel gas is provided to the hydrogen permeable membrane 20 via the through hole 11. Some hydrogen in the fuel gas is converted into protons at the hydrogen permeable membrane 20. The protons are conducted in the hydrogen permeable membrane 20 and the electrolyte 30, and get to the cathode 40.

On the other hand, an oxidant gas including oxygen is provided to the gas passageway 51 of the separator 50. This oxidant gas provided to the gas passageway 51 diffuses to a region of the cathode contacting with the contact portion 52. The oxidant gas is provided whole of an upper face of the cathode 40. The protons react with oxygen in the oxidant gas provided to the cathode 40. Water and electrical power are thus generated. The generated electrical power is collected via the contact portion 52 of the separator 50.

Electrical power is generated at whole area of the upper face of the cathode 40, because the oxidant gas provided to the gas passageway 51 is provided to the whole area of the upper face of the cathode 40. In particular, the electrical power is generated most effectively at an area of the cathode 40 contacting with the contact portion 52, because the cathode 40 contacts with the separator 50 through the contact portion 52. At the cathode 40, an electrical current density of the area contacting with the contact portion 52 is larger than that of an area of the gas passageway 51.

On the other hand, the fuel gas is provided to the hydrogen permeable membrane 20 via the through hole 11. At the hydrogen permeable membrane 20, an electrical current density at an area corresponding to the through hole 11 is higher than that at an area contacting with the strengthening portion 12. The areas of which electrical current density is relatively high are to face with each other, because the through hole 11 faces with the contact portion 52 in the fuel cell 100 in the embodiment. Influence of an electrical resistance of the electrolyte 30 is therefore reduced. And, the electric generation efficiency of the fuel cell 100 in accordance with the embodiment is increased.

Figure 2A:
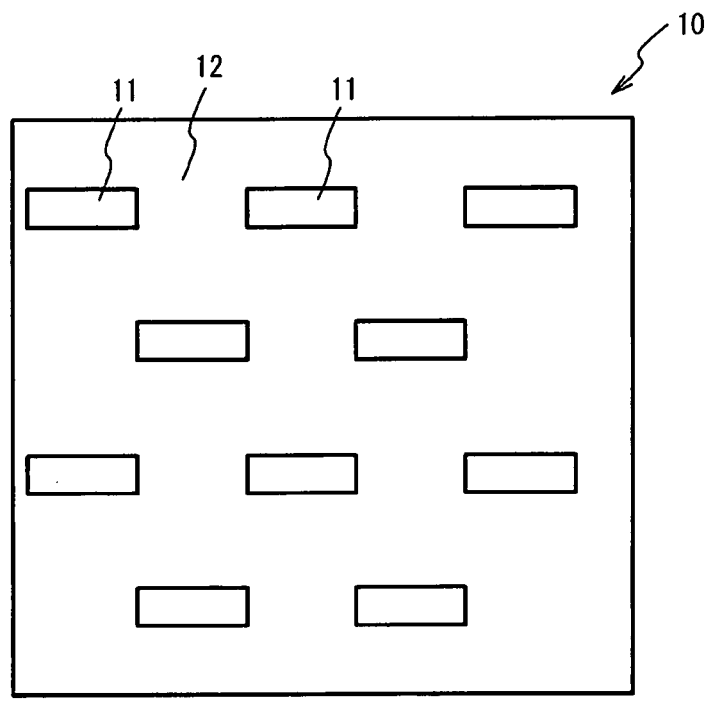
FIG. 2A and FIG. 2B illustrate a diagram accounting for a shape of a through hole and a contact portion.
Figure 2B:
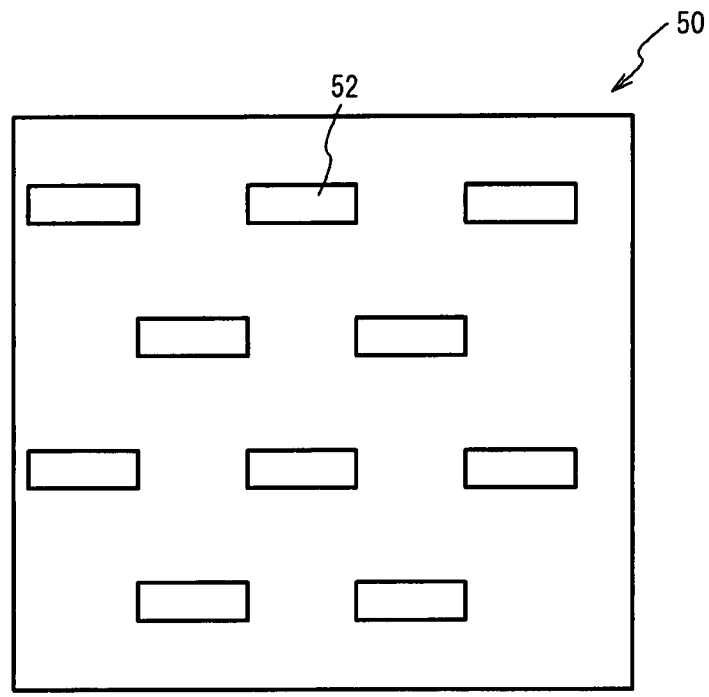

FIG. 2A and FIG. 2B illustrate a diagram accounting for a shape of the through hole 11 and the contact portion 52. FIG. 2A illustrates a top view of the strengthening substrate 10. FIG. 2B illustrates a bottom view of the separator 50. As shown in FIG. 2A, a plurality of the through holes 11 is formed in the strengthening substrate 10. As shown in FIG. 2B, the contact portion 52 composed of a plurality of projections is formed on the separator 50. It is preferable that an area ratio of the contact portion 52 on the separator 50 is approximately 1% to 10%. An area ratio of the through hole 11 at the strengthening substrate 10 is in the same range.

The strengthening substrate 10 and the separator 50 are laminated holding the hydrogen permeable membrane 20, the electrolyte 30 and the cathode 40 therebetween so that the through hole 11 faces with the contact portion 52. The contact portion 52 and the through hole 11 may not be arranged at even intervals on the lower face of the separator 50 and in the strengthening substrate 10. In the case, the effect of the present invention is obtained when the contact portion 52 faces with the through hole 11.

An opening area of the through hole 11 may not correspond to the contacting area of the contact portion 52. For example, a power generation region of the hydrogen permeable membrane 20 is used to a maximum extent even if the contacting area of the contact portion 52 is smaller than the opening area of the through hole 11, if the contact portion 52 faces with the through hole 11 so as to fit into the through hole 11. On the other hand, a power generation region of the cathode 40 is used to a maximum extent even if the opening area of the through hole 11 is smaller than the contacting area of the contact portion 52, if the through hole 11 faces with the contact portion 52 so as to fit into the contact portion 52.

Figure 3A:
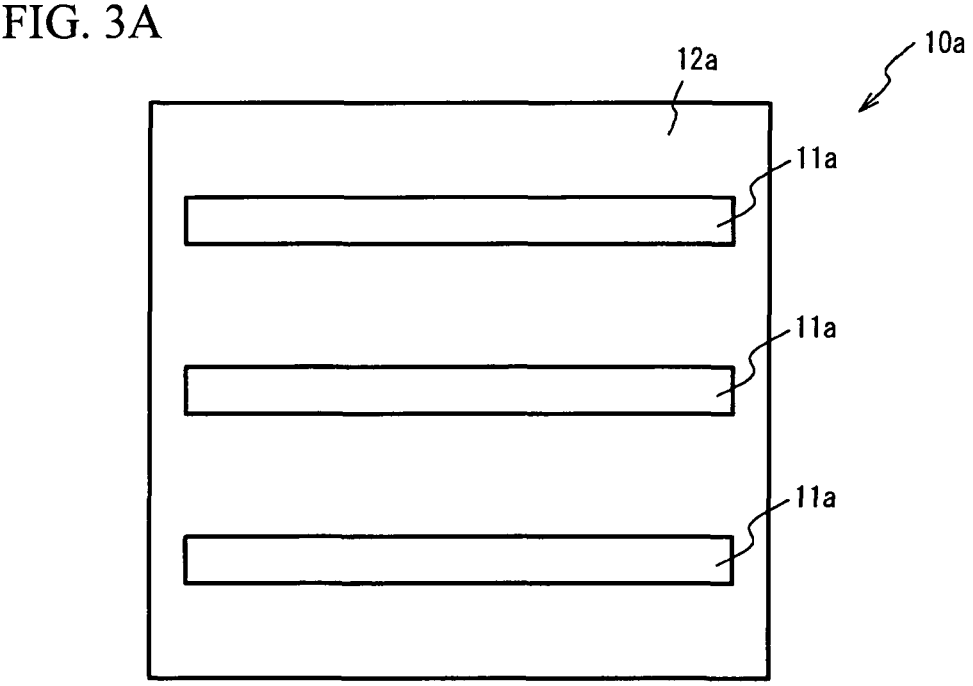
FIG. 3A and FIG. 3B illustrate a shape of a strengthening substrate and a separator.
Figure 3B:
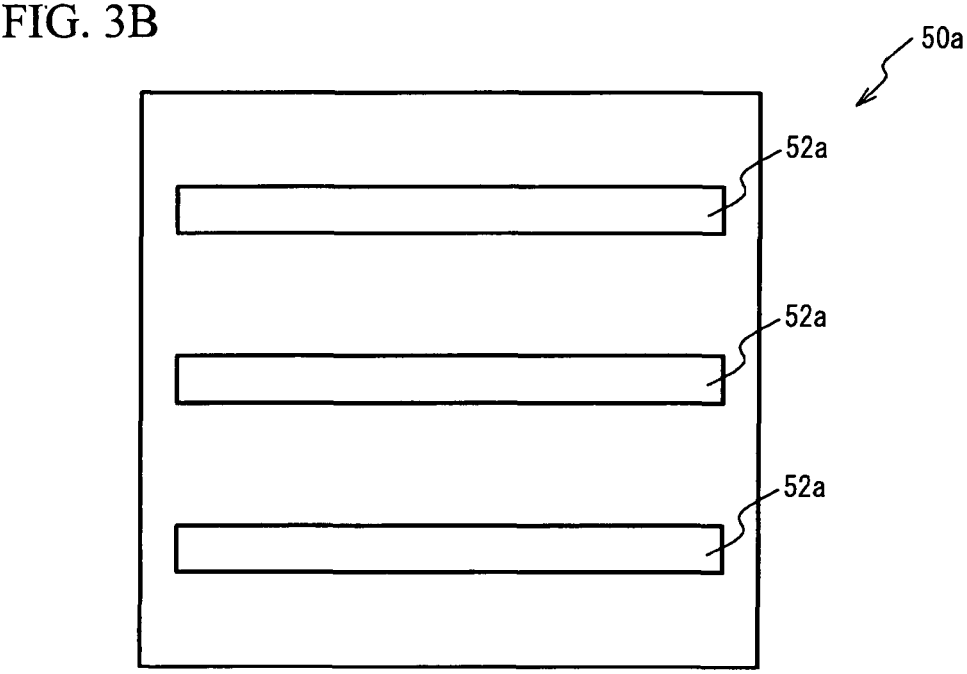

FIG. 3A through FIG. 5B respectively illustrate a shape of strengthening substrates 10a through 10c being another examples of the strengthening substrate 10 and a shape of separators 50a through 50c being another examples of the separator 50. FIG. 3A illustrates a top view of the strengthening substrate 10a. FIG. 3B illustrates a bottom view of the separator 50a. As shown in FIG. 3A, a through hole 11a having a stripe shape is formed in the center portion of the strengthening substrate 10. As shown in FIG. 3B, a contact portion 52a having a stripe shape is formed on the bottom face of the separator 50. A width of the through hole 11a is, for example, approximately 0.5 mm to 2 mm. An average interval between each of the through holes 11a is, for example, approximately 5 mm to 20 mm.

Figure 4A:
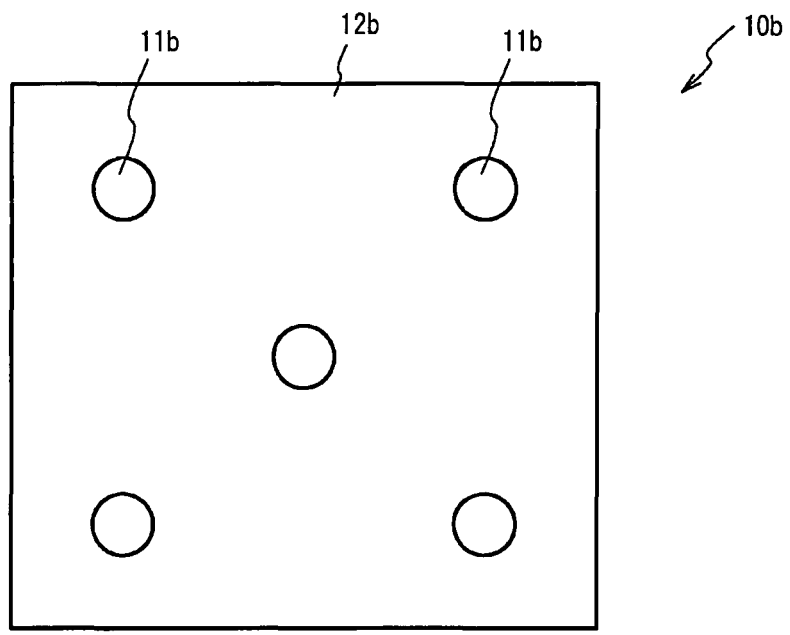
FIG. 4A and FIG. 4B illustrate a shape of a strengthening substrate and a separator.
Figure 4B:
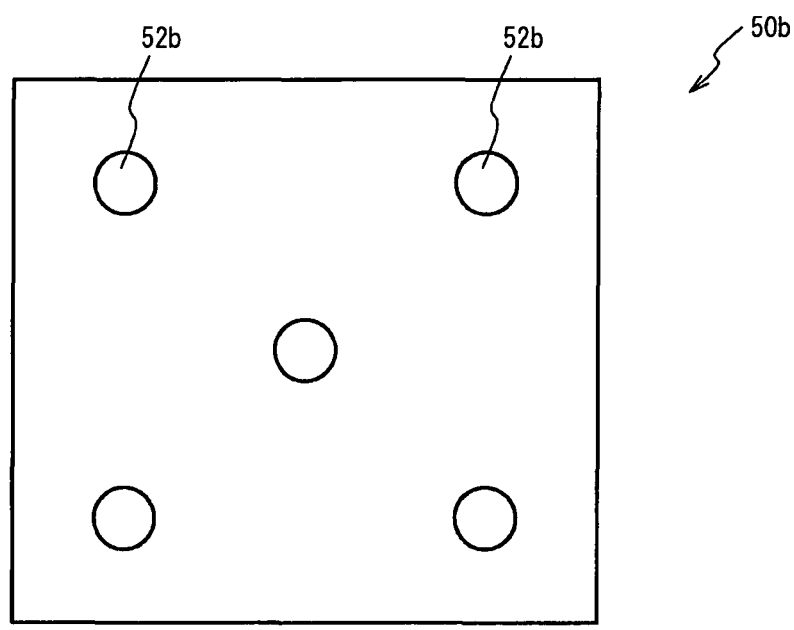

FIG. 4A illustrates a top view of the strengthening substrate 10b. FIG. 4B illustrates a bottom view of the separator 50b. As shown in FIG. 4A, a plurality of through holes 11b having a cylindrical shape is formed in the strengthening substrate 10b. As shown in FIG. 4B, a contact portion 52b composed of a plurality of projections having a cylindrical shape is formed on the separator 50b. A diameter of the through hole 11b is, for example, approximately 0.5 mm to 5 mm. An average interval between each of the through holes 11b is, for example, approximately 5 mm to 50 mm.

Figure 5A:
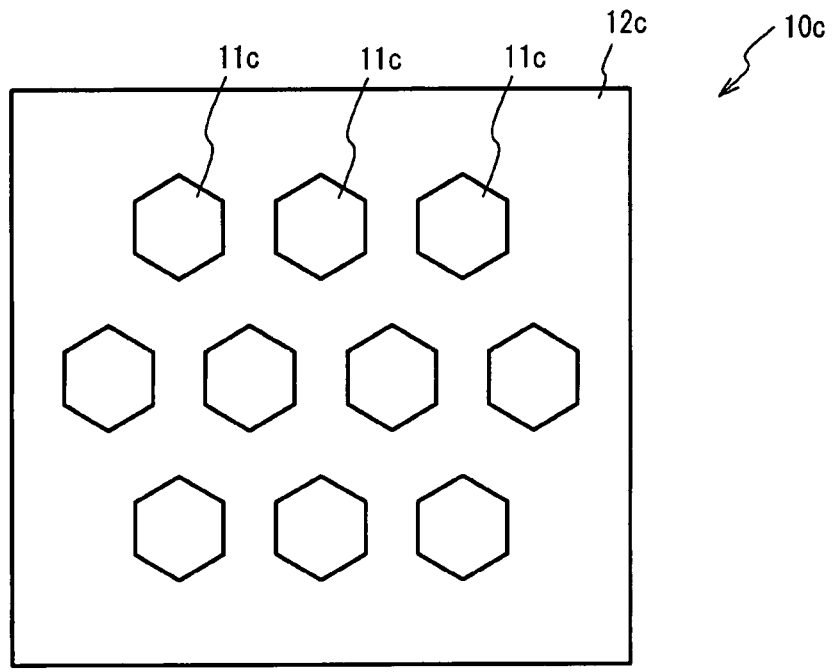
FIG. 5A and FIG. 5B illustrate a shape of a strengthening substrate and a separator.
Figure 5B:
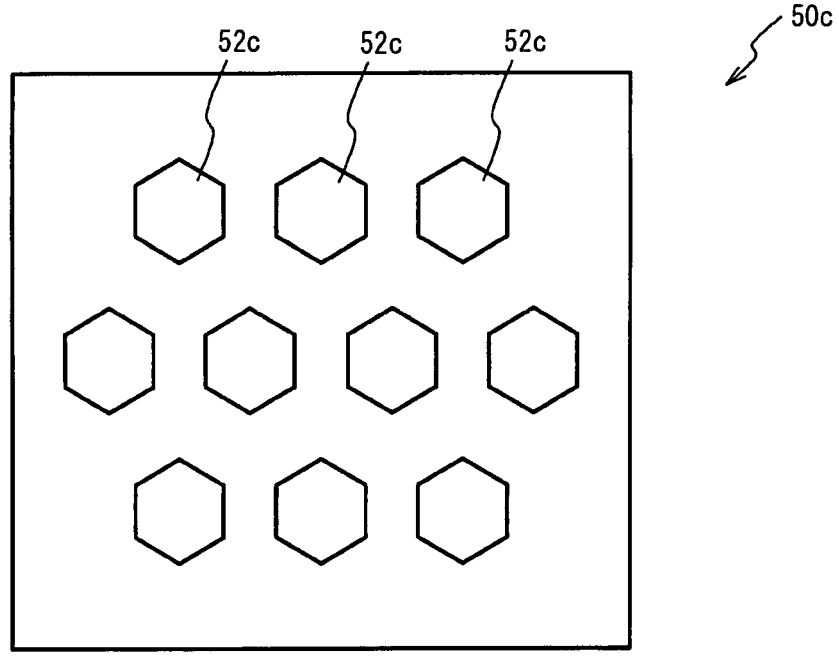

FIG. 5A illustrates a top view of the strengthening substrate 10c. FIG. 5B illustrates a bottom view of the separator 50c. As shown in FIG. 5A, a plurality of through holes 11c having a polygonal column shape is formed in the strengthening substrate 10c. As shown in FIG. 5B, a contact portion 52c composed of a plurality of projections having a polygonal column shape is formed on the separator 50c. The through hole 11c has, for example, a side length of approximately 0.5 mm to 5 mm. An average interval between each of the through holes 11c is, for example, approximately 5 mm to 50 mm.

A description is given of the shape of the through hole 11 of the strengthening substrate 10 and the contact portion 52 of the separator 50. The shape of the through hole 11 and the contact portion 52 is not limited to the above-mentioned shape. The effect of the present invention is obtained even if the through hole 11 and the contact portion 52 have another shape, if the through hole 11 and the contact portion 52 are formed so as to face with each other. And the effect of the present invention is obtained even if the opening area of the through hole 11 is different from the contacting area of the contact portion 52, if the opening area of the through hole 11 and the contacting area of the contact portion 52 are set so that one of the through hole 11 and the contact portion 52 is formed so as to fit into the other. In the embodiment, the through hole 11 corresponds to the penetration portion; the strengthening substrate 10 corresponds to the electrolyte-strengthening member; the contact portion 52 corresponds to the convex portion; and the cathode 40 corresponds to the anode.

Second Embodiment

Here, oxygen in oxidant gas flowing in a gas passageway is consumed in electric generation reaction of a fuel cell. A concentration of the oxygen in the oxidant gas flowing in the gas passageway gets reduced as closer to an outlet port of the oxidant gas. Therefore, there is a case where sufficient oxygen is not provided to a contacting area between a cathode and a separator around the outlet port of the oxidant gas, even if oxygen is provided to the cathode at the gas passageway. As a result, there is a case where the electric generation efficiency of the cathode at the gas passageway is higher than that of the contact portion between the cathode and the separator. In the embodiment, a description will be given of a fuel cell in consideration of the above-mentioned matter.

Figure 6:
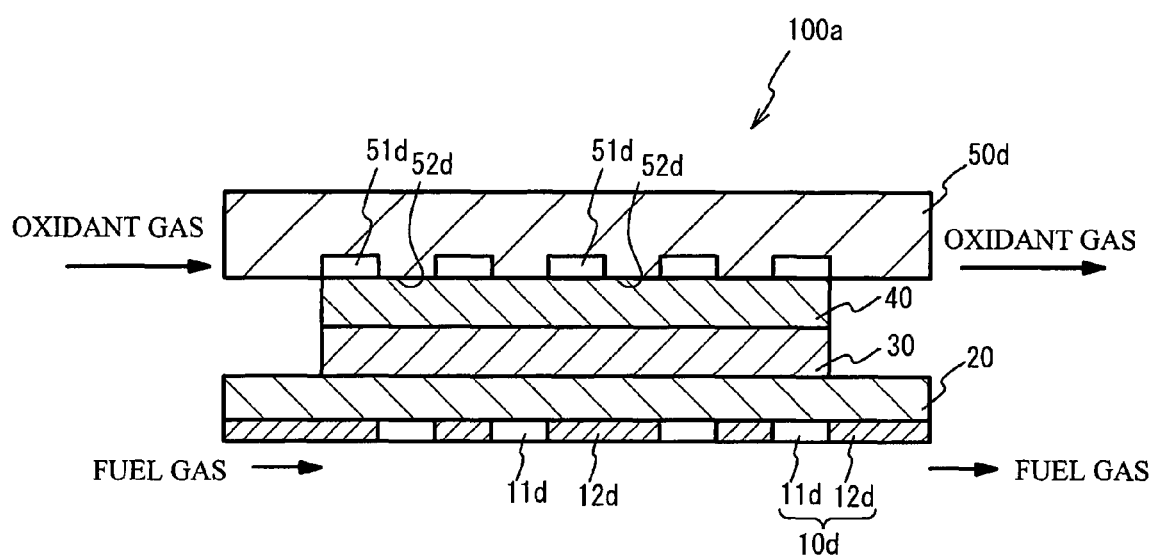
FIG. 6 illustrates a schematic cross sectional view of a fuel cell in accordance with a second embodiment of the present invention.

FIG. 6 illustrates a schematic cross sectional view of a fuel cell 100a in accordance with a second embodiment of the present invention. In the fuel cell 100a, a strengthening substrate 10d is provided instead of the strengthening substrate 10, and a separator 50d is provided instead of the separator 50, being different from the fuel cell 100 shown in FIG. 1. The strengthening substrate 10d is composed of a material as same as that of the strengthening substrate 10, and has a through hole 11d and a strengthening portion 12d. The separator 50d is composed of a material as same as that of the separator 50, and has a gas passageway 51d and a contact portion 52d.

In the embodiment, the through hole 11d of the strengthening substrate 10d faces with the contact portion 52d of the separator 50d at the side to which the oxidant gas is provided. The through hole 11d faces with the gas passageway 51d at the side from which the oxidant gas is exhausted. A high-electrical-current-density region of the hydrogen permeable membrane 20 faces with that of the cathode 40, even if the oxygen of the oxidant gas is consumed in the electric generation reaction of the fuel cell 100a. As a result, the electric generation efficiency of the fuel cell 100a is increased.

Third Embodiment

There is a case where an area ratio of a contact portion at a lower face of a separator is different from an opening area ratio of a strengthening substrate. In this case, there is a case where the contact portion of the separator does not face with a through hole of the strengthening substrate. In a third embodiment, a description will be given of a case where a part of the contact portion of the separator does not face with the through hole of the strengthening substrate.

Figure 7:
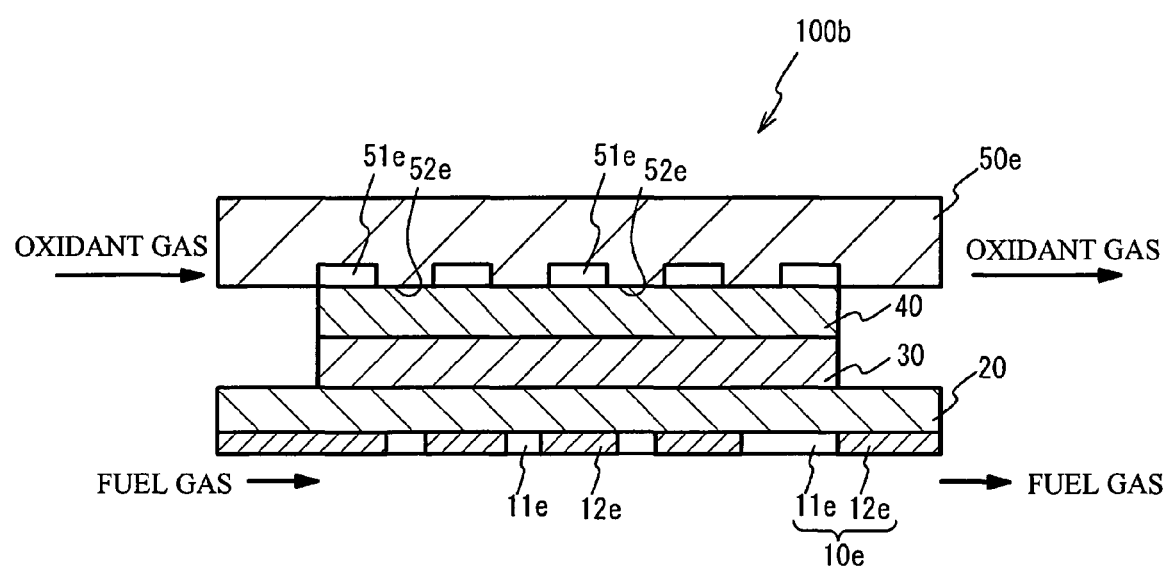
FIG. 7 illustrates a schematic cross sectional view of a fuel cell in accordance with a third embodiment of the present invention.

FIG. 7 illustrates a schematic cross sectional view of a fuel cell 100b in accordance with the third embodiment of the present invention. In the fuel cell 100b, a strengthening substrate 10e is provided instead of the strengthening substrate 10, and a separator 50e is provided instead of the separator 50, being different from the fuel cell 100 shown in FIG. 1. The strengthening substrate 10e is composed of a material as same as that of the strengthening substrate 10, and has a through hole 11e and a strengthening portion 12e. The separator 50e is composed of a material as same as that of the separator 50, and has a gas passageway 51e and a contact portion 52e.

An area ratio of the through hole 11e of the strengthening substrate 10e is approximately 40% to 80%. An area ratio of the contact portion 52e of the lower face of the separator 50e is approximately 5% to 50%. In the embodiment, a description will be given of a case where the area ratio of the through hole 11e of the strengthening substrate 10e is larger than the area ratio of the contact portion 52e of the lower face of the separator 50e.

In the embodiment, it is not always true that the through hole 11e of the strengthening substrate 10e corresponds to the contact portion 52e of the separator 50e, because the area ratio of the through hole 11e of the strengthening substrate 10e is different from that of the contact portion 52e at the lower face of the separator 50e. It is therefore not always true that the strengthening portion 12e of the strengthening substrate 10e faces with the gas passageway 51e of the separator 50e. A description will be given of a relationship between the position of the through hole 11e and the position of the contact portion 52e.

Figure 8A:
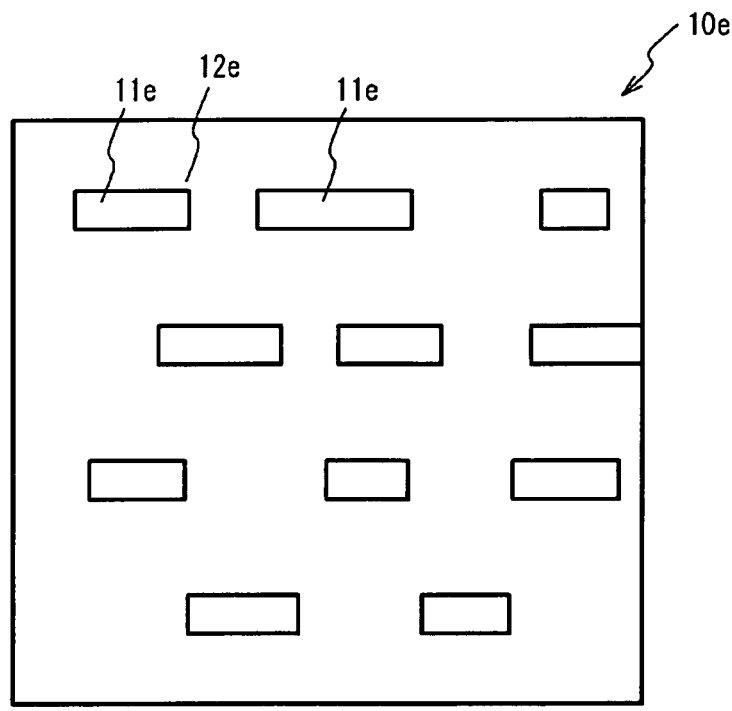
FIG. 8A and FIG. 8B illustrate a diagram accounting for a relationship between a position of a through hole and a position of a contact portion.
Figure 8B:
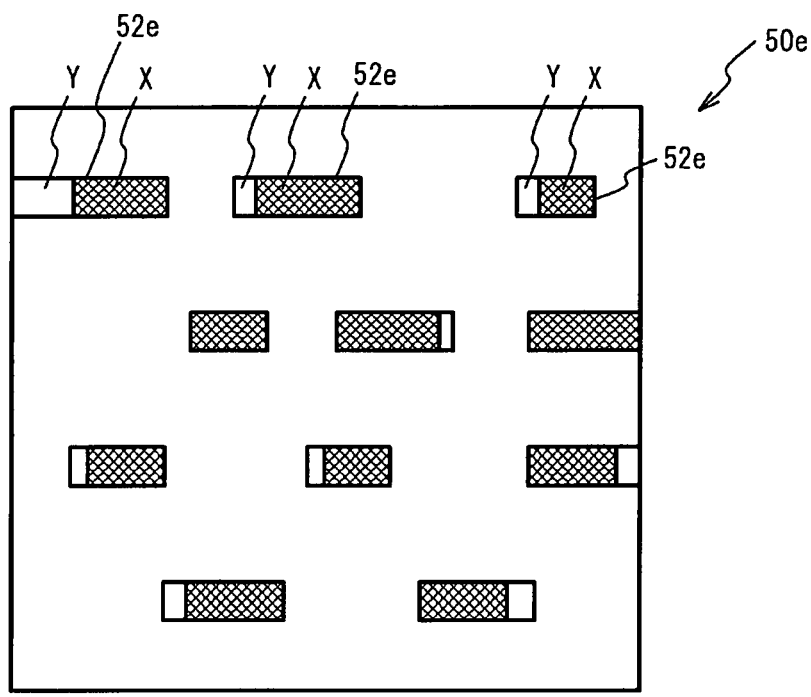

FIG. 8A and FIG. 8B illustrate a diagram accounting for the relationship between the position of the through hole 11e and the position of the contact portion 52e. FIG. 8A illustrates a top view of the strengthening substrate 10e.

FIG. 8B illustrates a bottom view of the separator 50e. A region of each contact portion 52e facing with the through hole 11e is referred to as a region X. A region of each contact portion 52e facing with the strengthening portion 12e is referred to as a region Y. In the embodiment, the contact portion 52e and the through hole 11e are formed so that the sum of the region X is larger than the sum of the region Y.

In a conventional fuel cell, the sum of the region X is substantially equal to the sum of the region Y, because the contact portion and the through hole are arranged in random order. The electric generation efficiency of the conventional fuel cell is therefore not high. On the other hand, in the embodiment, the sum of the region X is larger than the sum of the region Y. The electric generation efficiency of the fuel cell in accordance with the embodiment is therefore higher than that of the conventional fuel cell.

Fourth Embodiment

Figure 9:
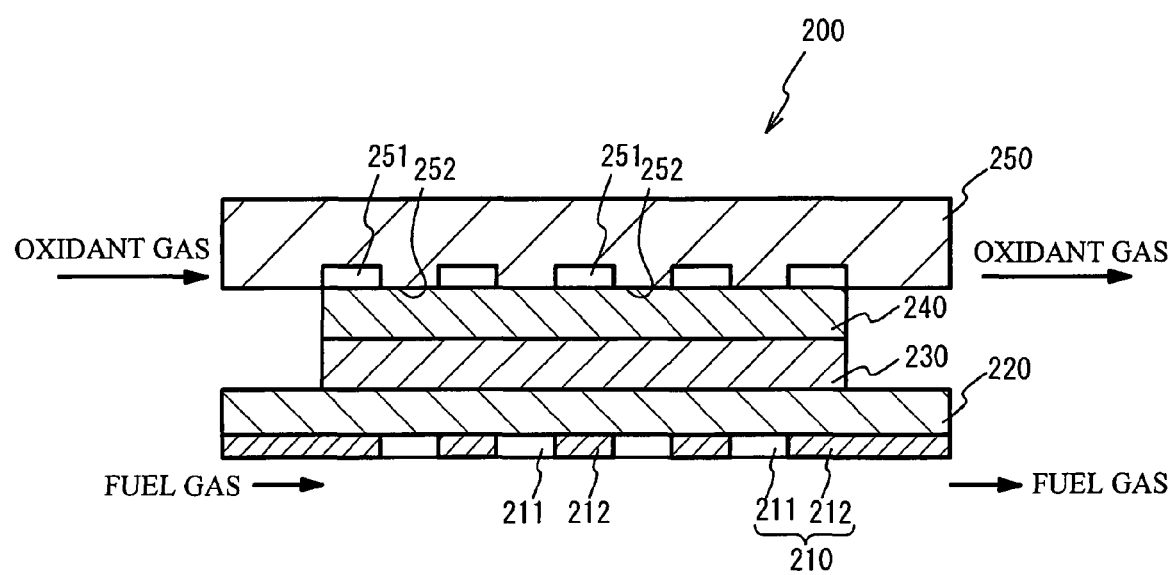
FIG. 9 illustrates a schematic cross sectional view of a fuel cell in accordance with a fourth embodiment of the present invention.

Next, a description will be given of a case where the present invention is applied to another type of a fuel cell other than the hydrogen permeable membrane fuel cell. In the embodiment, a description will be given of a fuel cell that is other than the hydrogen permeable membrane fuel cell and has a strengthening substrate strengthening an electrolyte. FIG. 9 illustrates a schematic cross sectional view of a fuel cell 200 in accordance with a fourth embodiment of the present invention. As shown in FIG. 9, the fuel cell 200 has a structure in which an anode 220, an electrolyte 230, a cathode 240 and a separator 250 are laminated on a strengthening substrate 210 in order.

The strengthening substrate 210 is composed of a metal substrate in which a plurality of through holes 211 is formed. A metal substrate such as a stainless steal may be used as the strengthening substrate 210. A portion of the strengthening substrate 210 contacting with the anode 220 is referred to as a strengthening portion 212. The anode 220 is an electrode to which fuel gas is provided. The cathode 240 is an electrode to which oxidant gas is provided. The electrolyte 230 is an electrolyte in which a proton or an oxygen ion is conducted. The separator 250 is composed of a conductive material such as stainless steal. A plurality of grooves is formed on the separator 250 at the cathode 40 side. The groove is referred to as a gas passageway 251. A portion of the separator 250 contacting with the cathode 240 is referred to as a contact portion 252.

An electrical power is generated most effectively at an area where the contact portion 252 contacts with the cathode 240, because oxidant gas is provided to not only the gas passageway 251 but also to the contact portion 252 and the contact portion 252 contacts with the cathode 240 in the separator 250. In the anode 220, fuel gas is provided to the through hole 211 of the strengthening substrate 210.

In the embodiment, the through hole 211 faces with the contact portion 252, and the strengthening substrate 210 and the separator 250 are formed so that the strengthening portion 212 faces with the gas passageway 251. This results in that areas having high electrical current density face with each other. Influence of an electrical resistance of the electrolyte 230 is therefore reduced. Accordingly, the electric generation efficiency of the fuel cell 200 is increased.

Figure 10:
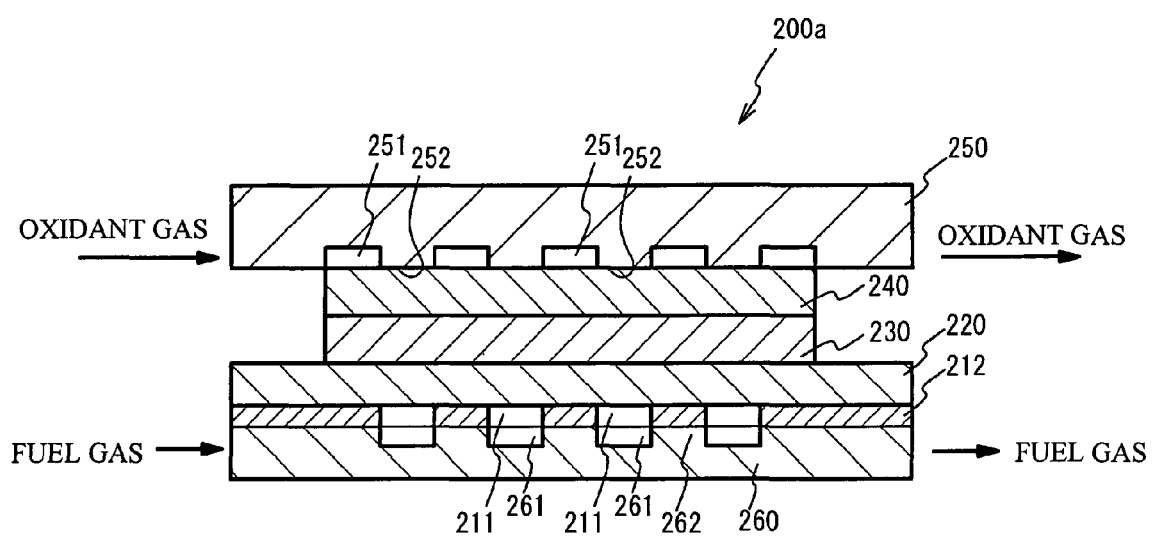
FIG. 10 illustrates a schematic cross sectional view of a fuel cell having a separator provided under a strengthening substrate.

A gas passageway of a separator provided under the strengthening substrate 210 may face with the through hole 211. The case is illustrated in FIG. 10. FIG. 10 illustrates a schematic cross sectional view of a fuel cell 200a having a separator provided under the strengthening substrate 210. As shown in FIG. 10, a separator 260 is provided under the strengthening substrate 210. The fuel cell 200a has the same structure as the fuel cell 200 shown in FIG. 9 except for the separator 260.

A gas passageway 261 and a contact portion 262 contacting with the strengthening substrate 210 are formed on an upper face of the separator 260. The contact portion 262 is formed so as to face with the strengthening portion 212. In this case, fuel gas provided to the gas passageway 261 is easy to be provided to the anode 220. This results in an improvement of the electric generation efficiency of the fuel cell 200a.

As mentioned above, the electric generation efficiency of a fuel cell is increased, if a gas passageway of an anode side separator, a through hole of a strengthening substrate, and a contact portion of a cathode side separator correspond to each other. The strengthening substrate 210 may be provided between the cathode 240 and the separator 250. In this case, the electric generation efficiency of the fuel cell 200a is increased, if the contact portion 262 of the separator 260, the through hole 211 of the strengthening substrate 210 and the gas passageway 251 of the separator 250 correspond to each other.

The invention claimed is:

1. A fuel cell comprising:
an electrolyte made of a perovskite-type proton conductor or a solid acid proton conductor;
an anode that is made of hydrogen permeable metal and is provided on the electrolyte;
an electrolyte-strengthening substrate provided on an opposite side of the anode, relative to the electrolyte, that has a penetration portion and strengthens the electrolyte, the penetration portion being formed by a plurality of through holes, each through hole having a cylindrical shape with a diameter of 0.5 mm to 5 mm;
a cathode that is provided on an opposite side of the electrolyte, relative to the electrolyte-strengthening substrate; and
a separator provided on the electrolyte-strengthening substrate, the separator having a gas passageway that faces the penetration portion;
wherein:
the cathode has a high-electrical-current-density region of which electrical current density is higher than an average electrical current density of the cathode and has a low-electrical-current-density region of which electrical current density is lower than the average electrical current density of the cathode; and
an area where the penetration portion faces with the high-electrical-current-density region is larger than that where the penetration portion faces with the low-electrical-current-density region.

2. The fuel cell as claimed in claim 1 wherein the penetration portion is arranged so as to face with the high-electrical-current-density region.

3. The fuel cell as claimed in claim 1 further comprising:
a separator that is provided on an opposite side of the cathode, relative to the electrolyte, and has a concave portion and a convex portion formed thereon at an electrolyte side,
wherein the high-electrical-current-density region is a region where the convex portion of the separator contacts with the cathode.

4. The fuel cell as claimed in claim 2 further comprising:
a separator that is provided on the an opposite side of the cathode, relative to the electrolyte, and has a concave portion and a convex portion formed thereon at an electrolyte side,
wherein the high-electrical-current-density region is a region where the convex portion of the separator contacts with the cathode.

5. The fuel cell as claimed in claim 1 wherein an area ratio of the through hole of the electrolyte-strengthening substrate is 40% to 80%.

6. The fuel cell as claimed in claim 1 wherein an area ratio of the high-electrical-current-density region of the cathode is 5% to 50%.

7. The fuel cell as claimed in claim 1 wherein an area ratio of the through hole of the electrolyte-strengthening substrate is 40% to 80% and an area ratio of the high-electrical-current-density region of the cathode is 5% to 50%.

* * * * *